(12) United States Patent
Abiri et al.

(10) Patent No.: US 10,588,049 B2
(45) Date of Patent: Mar. 10, 2020

(54) OPTIMIZING APPLICATIONS BEHAVIOR IN A DEVICE FOR POWER AND PERFORMANCE

(71) Applicant: Intel IP Corporation, Santa Clara, CA (US)

(72) Inventors: Roni Abiri, Raanana (IL); Segev Ravgad, Tal Aviv (IL); Olga Weisman, Rehovot (IL); Juergen H Kreuchauf, San Francisco, CA (US); Roy Ramon, Hod Hasharon (IL); Erez Tavor, Binyamina (IL); Ofer Zafrir, Moshav Kfar-Bilu (IL)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 14/671,994

(22) Filed: Mar. 27, 2015

(65) Prior Publication Data

US 2016/0286430 A1 Sep. 29, 2016

(51) Int. Cl.
*H04L 12/26* (2006.01)
*H04W 28/02* (2009.01)

(52) U.S. Cl.
CPC .... *H04W 28/0289* (2013.01); *H04W 28/0284* (2013.01)

(58) Field of Classification Search
CPC .......... H04W 28/0289; H04W 28/0242; H04L 47/12
See application file for complete search history.

(56) References Cited

U.S. PATENT DOCUMENTS

| | | | | |
|---|---|---|---|---|
| 9,264,868 B2* | 2/2016 | Giaretta | | H04W 4/003 |
| 2008/0186862 A1* | 8/2008 | Corbett | | H04W 72/0486 |
| | | | | 370/237 |
| 2011/0235586 A1* | 9/2011 | Han | | H04B 7/0426 |
| | | | | 370/328 |
| 2012/0124196 A1* | 5/2012 | Brisebois | | H04W 76/046 |
| | | | | 709/224 |
| 2012/0184321 A1* | 7/2012 | Baldessari | | H04W 52/267 |
| | | | | 455/522 |
| 2012/0302223 A1* | 11/2012 | Austin | | H04W 8/18 |
| | | | | 455/423 |
| 2013/0053091 A1* | 2/2013 | Jorguseski | | H04W 24/02 |
| | | | | 455/524 |
| 2013/0121147 A1 | 5/2013 | Tapia et al. | | |
| 2013/0142038 A1* | 6/2013 | Pan | | H04L 47/25 |
| | | | | 370/230 |
| 2013/0303145 A1* | 11/2013 | Harrang | | H04B 7/2606 |
| | | | | 455/418 |
| 2014/0022904 A1* | 1/2014 | Ahmad | | H04W 28/0289 |
| | | | | 370/235 |

(Continued)

OTHER PUBLICATIONS

Extended European Search report received for European Patent Application No. 16157753.1, dated Jun. 1, 2016, 10 pages.

(Continued)

*Primary Examiner* — Brandon M Renner
(74) *Attorney, Agent, or Firm* — Eschweiler & Potashnik, LLC

(57) ABSTRACT

Described herein are technologies related to an implementation of improving power and performance of a portable device by controlling background traffic of one or more device applications based upon a determined and measured radio link condition.

24 Claims, 8 Drawing Sheets

(56) References Cited

U.S. PATENT DOCUMENTS

| | | |
|---|---|---|
| 2014/0092734 A1 | 4/2014 | Ljung |
| 2014/0113616 A1 | 4/2014 | Ljung |
| 2014/0146681 A1 | 5/2014 | Gusavec et al. |
| 2015/0172955 A1* | 6/2015 | Meekel ............ H04W 28/0289 370/235 |
| 2015/0208277 A1* | 7/2015 | De Pasquale ........... H04L 47/11 370/230.1 |
| 2015/0230189 A1* | 8/2015 | Chen .................. H04W 52/244 455/522 |
| 2016/0080970 A1* | 3/2016 | Harris ............... H04W 28/0284 370/236 |
| 2016/0205671 A1* | 7/2016 | Tabet .................. H04W 72/042 370/329 |

OTHER PUBLICATIONS

Office Action and Search Report received for Taiwan Patent Application No. 105105649, dated Jan. 13, 2017, 5 pages of Taiwan Office Action including 13 pages of English Translation.

Office Action received for European Patent Application No. 16157753.1, dated Mar. 16, 2017, 8 pages.

* cited by examiner

| Congestion Level or Scenario | Identified by metrics of (3G terminology) | Impact on Portable Device 102 | Change of Behavior in Portable Device 102's Application(s) |
|---|---|---|---|
| DL Congestion / "Soft" Inaccessibility | • E.g. passive measurement<br>• Previously attempted DL resources | Slow, intermittent DL traffic | • Ability is limited as DL is network controlled<br>• Delay background traffic (updates, etc.)<br>• Block OTT VoIP Apps, keep only messaging active |
| UL Congestion / "Soft" Inaccessibility | • UL Noise rise measurement<br>• Previously attempted UL resources<br>• pRACH process duration (unsuccessful) | Slow, intermittent UL traffic | • Delay uploading large files<br>• Reduce resolution of any favorite content<br>• Limit messages to text only<br>• Favor Chatter PS (SMS vs. hangouts)<br>• Reduce frequency of "Keep Alive"<br>• Block OTT VoIP Apps, keep only messaging active |
| "Hard" Inaccessibility Indicator | • (enhanced) Access Class Barring<br>• pRACH process failure<br>• SIB2 failure | Lack of access<br>Repeated fails to connect | • Avoid initiating sessions during barring period to save power<br>• Per type of Barring, Favor CS over PS (SMS vs. hangouts)<br>• Apply aggressive traffic shaping<br>• Stop "keep Alive" |

FIG. 3

$$Tx_{init\_calculated} = P_{TX\_CPICH} - RSCP_{CPICH} + UL_{interference} - 27$$

FIG. 4(a)

Tx_init_calculated_LTE = LTE_InitialReceivedTargetPower + Path Loss (PL)

Path Loss (PL) = LTE_referenceSignalPower − LTE_RSRP

FIG. 4(b)

UL Noise Rise $_{dB}$ = UL Noise Level Report − UL Noise Level Report − Minimal Value Reported for the Cell ≈ UL Noise Level Report − (−103dB)

FIG. 6

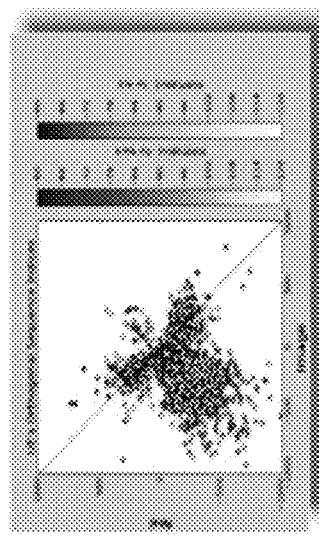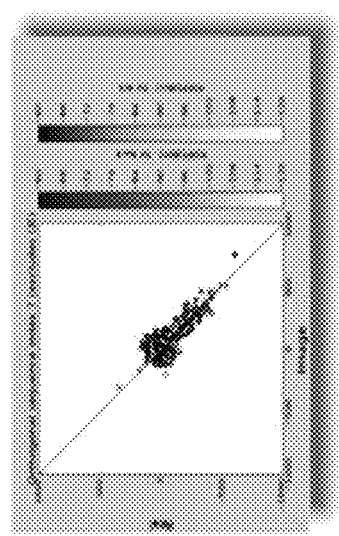

OPTIMIZING APPLICATIONS BEHAVIOR IN A DEVICE FOR POWER AND PERFORMANCE

BACKGROUND

Wireless communication systems such as cellular networks are dimensioned to support growing traffic. As the traffic demands vary significantly, for example, during time of the day, day of the week, or a special event, it is not economical, and in some cases not feasible, to dimension the network to support the highest traffic demand. In these occurrences or cases, the network is congested, impacting users' ability to access the network for sending or receiving data, initiating phone calls or performing a particular service that is offered by users' mobile devices.

The nature and severity of the congestion described above may vary from total blocking congestion as experienced in localized mass events, to short interruptions of service (e.g., drop calls), or to throttling of available bandwidth (BW). The present mechanisms that are implemented in the cellular network to optimize and balance the services during congestion state include traffic schedulers. However, present devices do not treat or are not aware of radio link congestion conditions. As such, there is a need to improve both power optimization and user experience of devices by overcoming the effects of congestion traffic.

BRIEF DESCRIPTION OF THE DRAWINGS

FIG. 3 illustrates an overview table that shows a summary of congestion levels as described herein.

FIGS. 4a and 4b illustrate an example embodiment of calculating radio-link conditions as described in present implementations herein.

FIG. 6 illustrates another example embodiment of calculating radio-link conditions as described herein.

With the FIGS. 7a and 7b illustrates an example calculation of LTE Base-station downlink (DL) load, based on the energy measurement of Physical Hybrid-ARQ Indicator Channel (PHICH).

Figure 8:
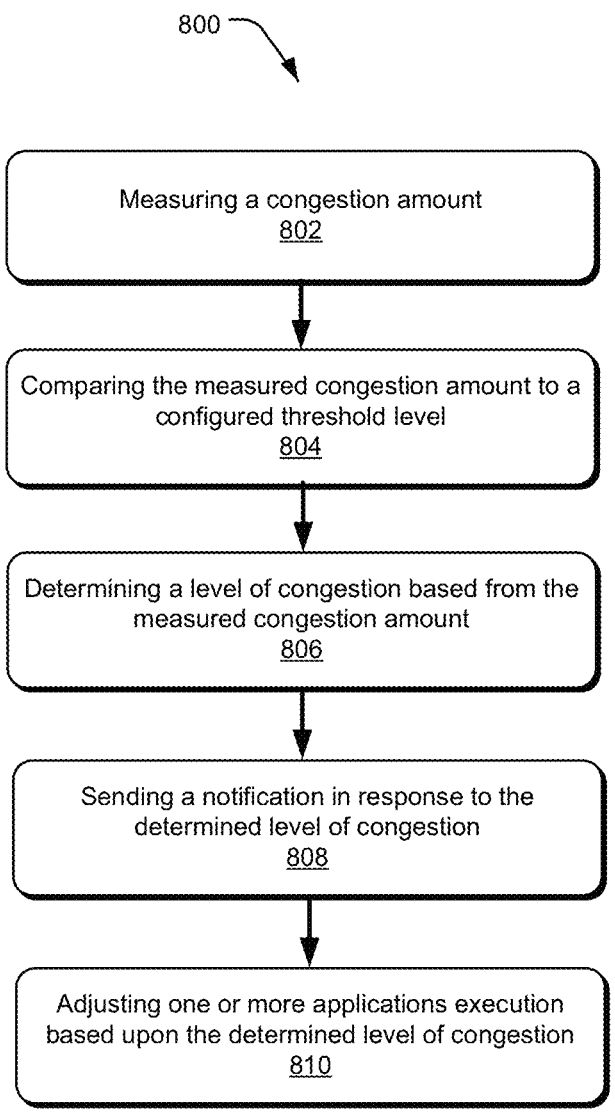

FIG. 8 illustrates an exemplary process flowchart of an example method for improving power and performance in a portable device.

DETAILED DESCRIPTION

Described herein are technologies for identifying and measuring radio link conditions and thereafter, using the identified and measured radio link conditions to improve power consumption and performance in a device. For example, the radio link conditions may refer to a poor radio frequency (RF) signal and/or to other congested conditions due to device and/or network conditions. The identified and measured radio link conditions may be utilized by a portable or mobile device to control accordingly the behavior of one or more applications.

In an implementation, the device may be configured to measure a congestion amount of the radio link conditions during downlink (DL) and/or uplink (UL) transmissions in the device. The measurement may be based from a type of network used by the portable device such as 3G, 4G, LTE network, as well as WiFi, etc. Furthermore, the measurement may be based from information that supplied by the device such as received signal strength indicator (RSSI), and parameters that may be extracted from a serving and/or neighboring base station. Furthermore, the measurements may be based upon a determined level of congestion such as a poor RF signal level, a soft congestion level, or a hard congestion level.

For example, in the case of poor RF signal and soft congestion levels, the measurements of the congestion amount may be implemented separately for the DL and UL transmissions. However, for the hard congestion level, the measurement of the congestion amount may be implemented for both UL and the DL transmissions (i.e., not separate). In these cases, the measurements of the congestion amount per link are more efficient for purposes of improving the power and performance in the portable device.

After obtaining the appropriate measured congestion amount as described above, the portable device may be configured to control accordingly the behavior of one or more applications that may be running in foreground or background tasks.

Figure 1:
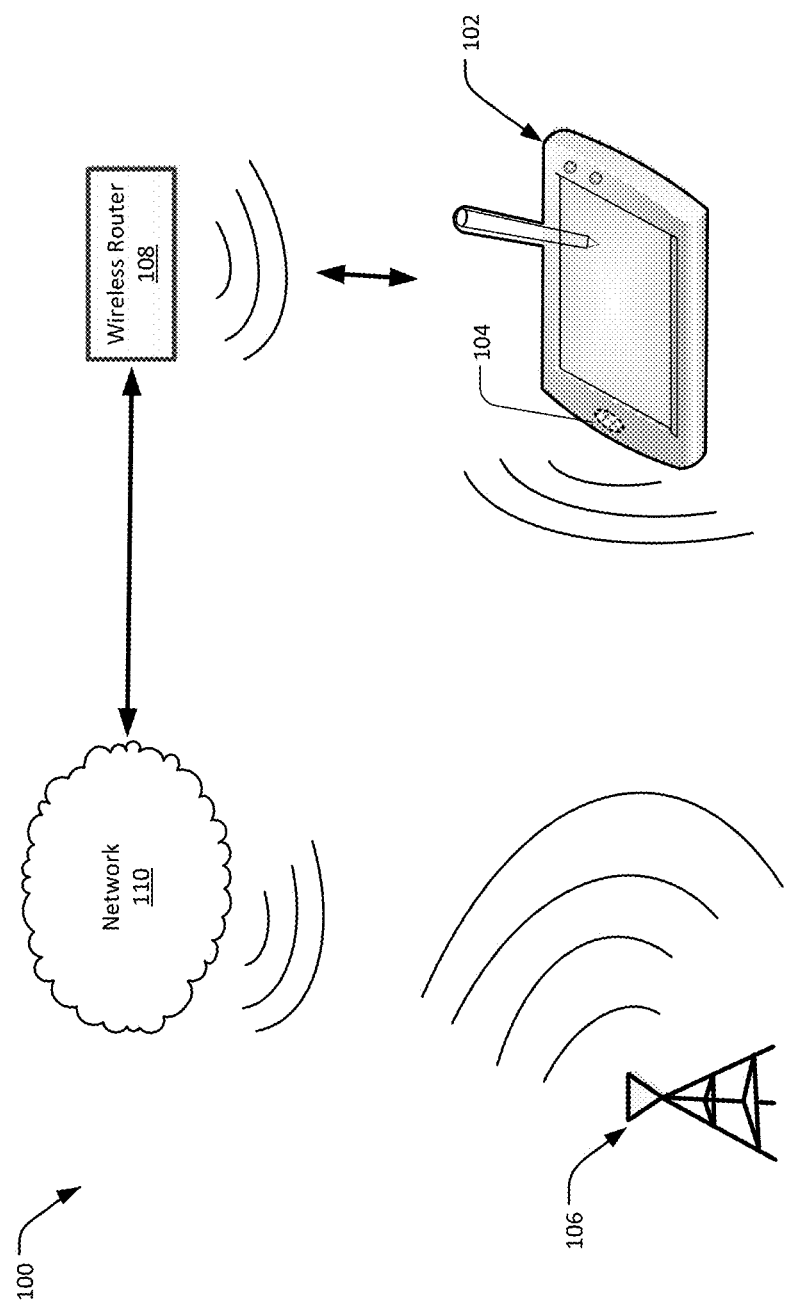
FIG. 1 illustrates an example scenario that implements an optimization of one or more device applications' behavior to improve power and performance during data communication in a device.

FIG. 1 is an example scenario 100 that implements an optimization of one or more device applications' behavior to improve power and performance during data communication in a device. For example, the application's behavior is controlled based on present and existing radio link conditions such as poor radio frequency (RF) signal and/or congestion conditions within the device and/or in the network. The scenario 100 shows a portable device 102 with an antenna 104, a base station 106, and a wireless router 108 that facilitates data communication to a network 110.

In an implementation, the portable device 102 may perform or process a background task such as a uploading to the network 110 or downloading from the network 110 during, for example, poor RF signal between the portable device 102 and the base station 106. In this implementation, the portable device 102 may be configured to detect, measure, compare, and/or calculate the present and existing bidirectional radio link conditions within the portable device itself and/or surrounding cells or base stations during the background task process. The reason being, the radio link conditions such as the poor RF signal may affect UL or DL transmission operations in the portable device 102.

The present and existing radio link conditions may be derived from, but are not limited to, effects of co-running application(s), components, or features within the portable device 102 as well as other devices, modem types such as 2G/3G/LTE-4G modems, overlapping cellular cells, effects of network 110 data, and the like. For a particular radio link condition (e.g., poor RF signal during the background task operation), the portable device 102 may be configured to implement an algorithm that may control the background traffic in the execution of one or more applications in the portable device 102. As further discussed below, the algorithm for the poor RF signal may utilize passive measurements of parameters from the portable device itself, measurements from the base station 106, and measurements from a modem (not shown). In this manner, there is no need for the portable device 102 to be awakened or to be network 110 connected as what it does is simply to listen to the cell's broadcast messages and additional information, and measure the above parameters and to compare them with a preconfigured threshold value. The threshold value, for example, may facilitate determination of a good or a poor RF signal.

In an implementation, the algorithm may allow the application(s) with low-power requirements to run; however, the rest of the one or more "power-hungry" applications may be placed on hold until, for example, the portable device 102 acquires a Wi-Fi connection from the wireless router 108. In this example, the portable device 102 does not waste its battery power by increasing power transmission given the low spectral efficiency due to the poor RF signals. In another case where the radio link condition amounts to a blocked cellular service (i.e., congested radio link condition), the algorithm may either stop execution of the one or more applications or trim down the amount of data and frequency of accessing the network 110, rather than continuously trying to access the network 110 to the inconvenience of a user. In the latter case, the algorithm may utilize a different set of variables as compared to the poor RF signal radio link condition.

The base station 106 may not be limited to a single base-station as illustrated, and one or more base stations 106 may cover or define a particular cellular cell or cells. Within the range of the base station 106, the portable device 102 may communicate with another portable device (not shown) through the base station 106. With the configuration of the portable device 102 as discussed above, the algorithm may minimize effects of the poor RF condition and other congestion condition, for example, during UL transmission in the portable device 102. As further discussed below, the algorithm may utilize information that may be extracted from parameters of the base station 106.

The portable device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, a machine and the like. The portable device 102 further supports a broad array of cellular and wireless services over a very broad frequency range. For example, in addition to cellular services such as GSM, UNITS, or LTE, the portable device 102 may also offer Wi-Fi/WLAN, BT, and WiGig connectivity.

With continuing reference to FIG. 1, the wireless router 108 may include a device that facilitates wireless connection between the portable 102 and a wired Ethernet connection. For example, the wireless router 108 may include a Wi-Fi router that provides a hotspot in a particular place. In this example, the Wi-Fi router may receive data signals from the portable device 102 (during UL data communication) and sends the received data signals to Internet using a physical, wired Ethernet connection. Similarly, the Wi-Fi router may communicate data to the portable device 102 (during DL data communication) using the wireless connection between the two. The embodiments described in FIG. 1 are not limited to the wireless router 108 but may also include other form of wireless communications services that may be utilized by the portable device 102 during the poor RF signal or congested radio link condition.

Figure 2:
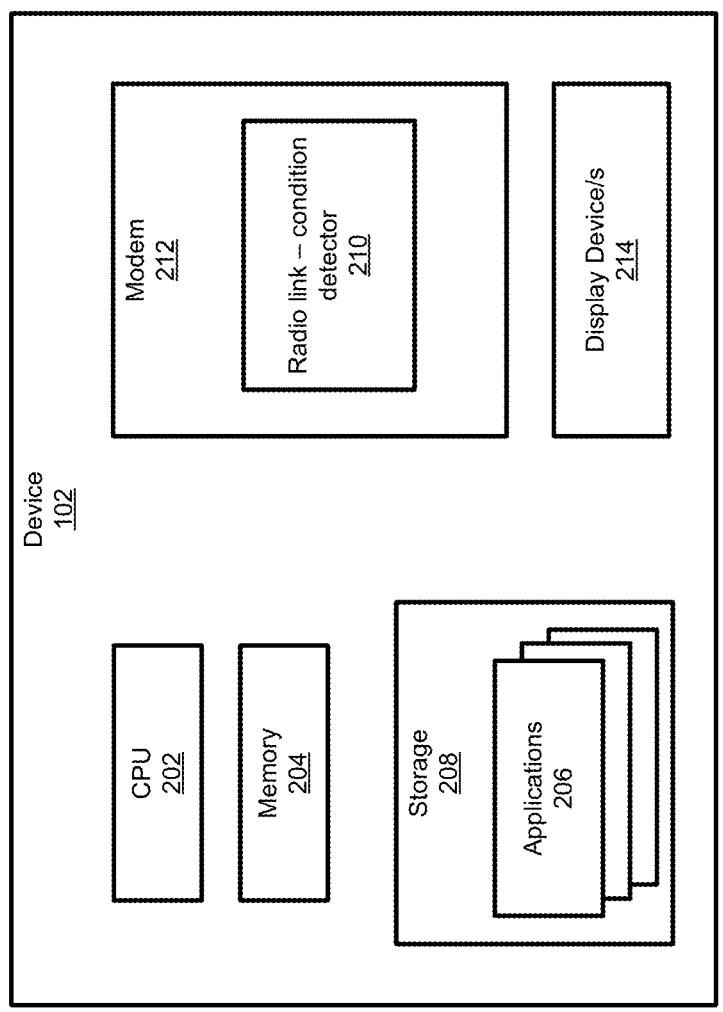
FIG. 2 is an example block diagram of a portable device that implements the embodiments described herein.

FIG. 2 is an example block diagram of a portable device 102 that may implement the embodiments described herein. The portable device 102 may include a control processing unit (CPU) 202, a memory device 204, one or more applications 206 that may be stored in a storage 208, a radio link-condition detector 210, a modem 212, and a display device 214. In certain implementations, the radio link-condition detector 210 is part of the modem 212.

As discussed above, the portable device 102 utilizes the radio link conditions to measure the current RF signal and/or congestion levels that may affect the UL and DL transmissions in the portable device. As described herein, a passive identification of the radio link conditions may result to a 1) poor RF condition; 2) soft congestion; and 3) hard congestion or blocking condition. For the first two radio conditions (i.e., poor RF condition and the soft congestion), the algorithm may separately perform measurements or identification of parameters for the UL and DL transmissions. However, for the hard congestion condition, the algorithm may utilize both UL and DL transmissions.

The passive identification may not require an active connection to the network 110 and as such, the passive identification process may require a lower power implementation. In other words, there is no need to awaken the operating system (OS) for the passive identification to be implemented. However, the user may be alerted of the existence of extreme conditions for manual control, for example, of background traffic of selected background tasks or applications.

In certain implementations, the control processing unit (CPU) 202 and OS are provided by an entity, and the modem 212 is provided by a different entity. It is to be understood that the various described components and systems may be grouped or provided by different entities, and integrated with another on a device.

With continuing reference to FIG. 2, the portable device 102 may include the CPU 202 that may be configured to execute stored instructions, as well as the memory device 204 that stores instructions, which are executable by the CPU 202. The CPU 202 may control and coordinate the overall operations of the portable device 102. Furthermore, the CPU 202 may be a single core processor, a multi-core processor, a computing cluster, or any number of other configurations.

In an implementation, the memory device 204 may include a main memory of the portable device 102. In addition, the memory device 204 may include any form of random access memory (RAM), read-only memory (ROM), flash memory, or the like. For example, the memory device 204 may be one or more banks of memory chips or integrated circuits. In this example, the CPU 202 may have direct access to the memory device 204 through a bus connection (not shown).

The instructions that are executed by the CPU 202 may be used to execute any of a number of applications 206 residing within the storage device 208 of the portable device 102. The applications 206 may be any types of applications or programs having graphics, sounds, graphics images, or the like, to be displayed to a user (not shown) through the display device 214. The storage device 208 may include a hard drive, an optical drive, a thumb drive, an array of drives, or any combinations thereof.

In an implementation, the radio link-condition detector 210 may include a processor, firmware, hardware, software or a combination thereof to identify and measure the surrounding radio link conditions (i.e., poor RF signal and/or congested network) and to facilitate the controlling of behavior of background or foreground tasks (i.e., applications 206) for power optimization and high throughput during data communication. That is, the radio link-condition detector 210 may implement the controlling of the background traffic for selected one or more applications based from the measured present and existing radio link conditions. As discussed above, the radio link-condition detector 210 may be part of modem 212.

For example, the radio link-condition detector 210 may be configured to implement and perform the algorithm as generally described above. In this example, the radio link-condition detector 210 may first determine whether the present and existing radio link condition includes the poor RF condition, the soft congestion or the hard congestion (blocking condition). With this determination, the algorithm may facilitate measurements of parameters within the portable device 102 such as the parameters supplied by the modem 212, and/or parameters that may be extracted from the base station 106. In such a case, the radio link conditions during DL and UL modes are considered for purposes of adjusting the foreground and background tasks that are currently running in the portable device 102. For example, the algorithm may further facilitate dynamic control of the running of power-hungry applications depending upon the varying congestion level measurements during the UL and/or DL transmissions.

FIG. 3 illustrates an overview table 300 that enumerates a summary of congestion levels as described herein. For example, as described in the functions of radio link-condition detector 210 above, the table 300 may enumerate the passively identified radio link conditions together with its corresponding effects and action(s) required for these effects. For purposes of illustration, the table 300 includes the following columns: a congestion level 302, an identification of metrics 304, an impact on the portable device 306; and effects on the application's behavior 308.

For example, the DL congestion for soft inaccessibility (shown in column 302) may be identified by the algorithm through passive measurements and/or previously allocated DL resources (shown in column 304). In this example, the impact on the portable device 102 includes slow and intermittent DL traffic (column 306) while the change of behavior for this congestion level includes, for example, a delay background traffic (shown in column 308).

In another example, the UL congestion for soft inaccessibility (shown in column 302) may be identified through UL noise rise measurements, previously allocated UL resources or, if successful, physical Random Access Channel (pRACH) process duration (shown in column 304). In this example, the impact on the portable device 102 includes slow and intermittent DL traffic (column 306) while the change of behavior for this congestion level includes, for example, a delay in uploading large files (shown in column 308).

In another example still, the hard inaccessibility indicator (shown in column 302) may be identified, for example, through pRACH process failure, access class barring, or RRM failure (shown in column 304). In this example, the impact on the portable device 102 includes lack of access or repeated failure to connect (column 306) while the change of behavior for this congestion level includes, for example, avoid initiating sessions during barring period to save power (shown in column 308).

FIGS. 4(a) and 4(b) illustrate an example embodiment of calculating radio-link conditions as described in present implementations herein. The equations, formulas, measurement parameters, etc. as further discussed below may be implemented by the radio link-condition detector 210 through the algorithm as described herein.

FIG. 4(a) illustrates an equation that may be utilized to determine the amount of transmitting power that the portable device 102 is currently using to perform, for example, network loading or network downloading. Based from determined amount of transmitting power, the effect(s), for example, of the poor RF signal in the portable device 102 during 3G data communications may be determined.

For example, if a calculated amount of initial transmission power ($Tx_{init\text{-}calculated}$ 400) in the portable device 102 during the 3G data communication is above the pre-configured threshold level, then a flag (not shown) that represents presence of "poor RF signal" may be activated. Otherwise, the UL transmission in the portable device 102 may continue its normal operations because the presence of "poor RF signal" does not affect at all its regular transmission operations. In this example, the threshold level may include a parameter amount or value that generally distinguishes a good radio link condition from a poor radio link condition.

With continued reference to FIG. 4(a), the measurement of the $Tx_{init\text{-}calculated}$ 400 in 3G networks may be performed in passive mode. That is, the portable device 102 needs only to observe the parameters or variables contained in the equation without being connected to any network, such as the network 110. In this implementation, the $Tx_{init\text{-}calculated}$ 400 may be based upon the following variables: $P_{TX\text{-}CPICH}$ 402 that is a parameter received by the system information blocks (SIB) of the portable device 102 from the base station 106; $RSCP_{CPICH}$ 404 that is a parameter that is measured from the modem 212; $UL_{interference}$ 406 that is a measurement received from the base station 106; and constant variable 408 (i.e., "27"). As can be observed from the equation, the $Tx_{init\text{-}calculated}$ 400 is based from radio link conditions or information within the portable device 102 and also from the radio link conditions that may be extracted from the parameters of the base station 106.

FIG. 4(b) illustrates the measurements of the initial transmission power ($Tx_{init\text{-}calculated}$ LTE 410) in the portable device 102 for the LTE networks. As shown, the $Tx_{init\text{-}calculated}$ LTE 410 may be based upon the following variables: LTE_InitialReceivedTargetPower 412; and Path Loss (PL) 414 where the PL 414 is equal to the difference between the LTE_referenceSignalPower 416 and the LTE_RSRP 418 variables.

With the obtained $Tx_{init\text{-}calculated}$ 400 and $Tx_{init\text{-}calculated\_LTE}$ 410 for 3G and LTE networks, respectively, the algorithm may be configured to control the device applications' behavior as described herein.

Figure 5:
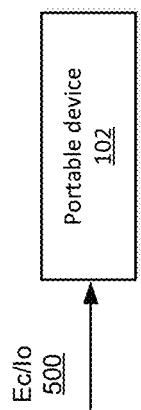
FIG. 5 illustrates an example of extracting physical (PHY) data from a modem as described in present implementations herein.

FIG. 5 an embodiment of extracting physical (PHY) data from a modem as described in present implementations herein. In this embodiment, the algorithm may separately treat the DL radio link conditions from the UL radio link conditions. For example, when more than one portable device accesses the base station 106, each of these other portable devices may provide an additional noise to one another or to the system. To this end, the algorithm may be configured to calculate and measure the amount of congestion traffic during DL and/or UL transmissions such as in the 3G or LTE system To calculate the DL congestion in the 3G network, a signal energy per chip (Ec/Io) 500 may represent the DL congestion traffic that may be measured in the receiver portable device 102. With the measured Ec/Io 500, a parameter (i.e., $\gamma_{DL}$) is calculated and normalized to provide the measured relative load parameter of the serving base station (e.g., base station 106). In this example, the algorithm may improve accuracy of DL congestion modelling by using additional information obtained from the modem 212 (e.g., RSCP and RSSI) and UL congestion indications (i.e., neighboring cellular cell measurements).

In an implementation, the algorithm utilizes Eq. 1 below to measure the Ec/Io 500 in dB:

$Ec/Io = RSCP_{dBm} - RSSI_{dBm}$ as reported by the modem 212 in dB  Eq. 1 where $RSCP_{in\ dBm} = 30 + 10 \log(CPICH\ Received\ Power\ Level)$.

With this Ec/Io 500 measurements, a normalized DL congestion indicator ($\gamma_{DL}$) may be calculated, defined and normalized to include zero to 100% value where the ($\gamma_{DL}$) may be calculated in Eq. 2 below.

$$\gamma_{DL} = \frac{\text{Total } Tx \text{ Power} - [CPICH + \text{Paging } Tx \text{ Power}]}{\text{Total } TxPower \text{ of serving cell}} \cdot \frac{\text{Maximal } Tx \text{ Power}}{\text{Maximal } Tx \text{ Power} - [CPICH + \text{Paging } Tx \text{ Power}]} \quad \text{Eq. 2}$$

Based from the derived value of the $\gamma_{DL}$ in Eq. 2, the following congestion level conditions may be derived: 1) low congestion may be defined by $25\% > \gamma_{DL} \geq 0\%$; 2) medium congestion may be defined by $50\% > \gamma_{DL} \geq 25\%$; and 3) high congestion is defined by $\gamma_{DL} \geq 50\%$. With these congestion levels, the algorithm may implement the necessary control of the background tasks as appropriate.

In another implementation such as the extraction of the $\gamma_{DL}$ from a modem data, the Ec/Io 500 is first calculated and based from the calculated value and the following assumptions, the ratio below is computed.

$$\frac{CPICH\ Tx\ \text{Power}}{\text{Total } Tx\ \text{Power}}$$

The assumptions in the approximation of the $\gamma_{DL}$ includes: 1) that the neighboring cellular cells have similar loads compared to the service cell (i.e., base station 106); 2) that the paging channels overhead is 30% of the CPICH power; and 3) that the nominal CPICH power ratio is 2-5% of maximal cell transmission power as further discussed in $\beta_{Max}$ equation below. CPICH is common pilot channel.

Going back to the Ec/Io 500, the following assumption is further considered (i.e., values are in watts):

$$10^{[Ec/Io]/10} = \frac{CPICH\ Rx\ \text{Power Level}}{F \cdot N_0 \cdot B + \text{Total } Rx\ \text{Power of serving cell} + \text{Total } Rx\ \text{Power of Other Cells}};$$

$$10^{\frac{[Ec/Io]}{10}} = \frac{F \cdot N_0 \cdot B + \text{Total } Rx\ \text{Power of serving cell} + \text{Total } Rx\ \text{Power of Other Cells Power Level}}{CPICH\ Rx\ \text{Power Level}} =$$

$$\frac{NF \cdot N_0 \cdot BW}{CPICH\ Rx\ \text{Power Level}} + \frac{\text{Total } Rx\ \text{Power of serving cell}}{CPICH\ Rx\ \text{Power Level}} +$$

-continued $$\frac{\text{Total } Rx\ \text{Power of Other Cells}}{CPICH\ Rx\ \text{Power Level}};$$

and $$\frac{NF \cdot N_0 \cdot BW}{CPICH\ Rx\ \text{Power Level}} = 10^{\frac{-104 - RSCP\ [dBm]}{10}}.$$

Assuming that ratio β is measured as:

$$\beta = \frac{\text{Total } Rx\ \text{Power of serving cell}}{CPICH\ Rx\ \text{Power Level}} = \frac{\text{Total } Tx\ \text{Power of serving cell}}{CPICH\ Tx\ \text{Power Level}}$$

Also, assuming that the ratio β is identical for all cellular cells (i.e., this is not correct; however, the error is limited), then the assumption below takes place.

$$10^{-[Ec/Io]/10} - 10^{\frac{-104 - RSCP\ [dBm]}{10}} = \beta + \frac{\text{Total } Rx\ \text{Power of Other Cells}}{CPICH\ Rx\ \text{Power Level}}$$

$$= \beta + \frac{\Sigma \beta \cdot \text{Other Cells } CPICH\ Rx\ \text{Power Levels}}{CPICH\ Rx\ \text{Power Level}}$$

$$= \beta \cdot \frac{\Sigma\ \text{All Cells } CPICH\ Rx\ \text{Power Levels}}{CPICH\ Rx\ \text{Power Level}}.$$

With the assumption that the ratio β is identical for all cellular cells, ratio β may be computed as:

$$\beta = \left[10^{-\frac{[Ec/Io]}{10}} - 10^{\frac{-104 - RSCP\ [dBm]}{10}}\right] \cdot \frac{CPICH\ Rx\ \text{Power Level of serving cell}}{\Sigma\ \text{All Cells } CPICH\ Rx\ \text{Power Levels}}.$$

Assuming further that CPICH Tx Power is 2÷5% of maximal base station 106 Tx power ($\beta_{Max}=20÷50$), and that the Paging Channels overhead is ~30% of the CPICH power, then the following may be derived:

$$\gamma_{DL} = \frac{\text{Total } Tx\ \text{Power} - [1.3 \cdot CPICH\ Tx\ \text{Power}]}{\text{Traffic Usable } NodeB\ Tx\ \text{Power}} =$$

$$\frac{\text{Total } Tx\ \text{Power} - [1.3 \cdot CPICH\ Tx\ \text{Power}]}{\text{Maximal } Tx\ \text{Power} - [1.3 \cdot CPICH\ Tx\ \text{Power}]} =$$

$$\frac{\frac{\text{Total } Tx\ \text{Power}}{CPICH\ Tx\ \text{Power}} - 1.3}{\beta_{Max} - 1.3} = \frac{\beta - 1.3}{\beta_{Max} - 1.3} \cdot 100\%.$$

As an example, for $\beta_{Max}=20$, the following equation is determined, $5.35 \cdot \beta - 6.95$.

As another example, for $\beta_{Max}=25$, the following equation is determined, $4.22 \cdot \beta - 5.48$.

As the calculations above are approximate, the $\gamma_{DL}$ may have either negative or over 100% values which may be truncated accordingly. Furthermore, all power levels in the above equations are in watts (not dBm). Furthermore still, the accuracy of the CPICH power level that is reported by the base station 106 in SIB when divided by the maximal Tx power (i.e., 40 watts) is:

$$\beta_{Max} = \frac{\text{Maximal Transmit Power [40 W]}}{\text{CPICH Transmit Power [W] as reported in } SIB}$$

FIG. 6 illustrates another example embodiment for calculating radio-link conditions as described herein. As shown, the equation may be utilized to estimate uplink congestion in 3G based at least from an information extracted from the parameters of the base station 106.

For the 3G networks, a report of received noise level by the base station 106 may be utilized to map its uplink load. For example, as shown in table below, the normalized UL congestion indicator ($\gamma_{UL}$) may include different values (e.g., 0%, 20%, etc.) that corresponds with different values of UL noise rise 600 (i.e., in dB). The UL noise rise 600, for example, may be based from the following parameters: "UL noise level report" 602 and "minimal value reported for the cell" 604. In another example, the UL noise rise 600 may be approximated to include the difference between the "UL noise level report" 602 and negative 103 dB. The equation in FIG. 6 is repeated below for purposes of illustration.

$$UL \text{ Noise } Rise_{dB} =$$
$$UL \text{ Noise Level Report} - \text{Minimal Value Reported for the Cell} \approx$$
$$UL \text{ Noise Level Report} - (-103)$$

With the derived amount or value of the UL noise rise 600, the table below may be utilized to derive the corresponding normalized UL congestion indicator ($\gamma_{UL}$) 502.

| UL Noise Rise in dB | $\gamma_{UL}$ Congestion Indicator |
|---|---|
| 0 to 1 | 0% |
| 2 to 4 | 20% |
| 5 to 7 | 40% |
| 8 to 11 | 60% |
| 12 to 15 | 80% |
| 16 or above | 100% |

To calculate the DL congestion in the LTE network, a signal energy per chip (1/RSRQ) may represent the DL congestion traffic that may be measured in the receiver portable device. With the measured (1/RSRQ), a parameter (i.e., β) is calculated and normalized to provide the measured relative load parameter of the serving base station. In this example, the algorithm may improve accuracy of DL congestion modelling by using additional information obtained from the modem (e.g., RSRP and RSSI).

For example, the congestion amount in a 3G/4G DL transmission may include a calculation of a base-station load based on PHY measurements, RSSI, Ec/Io for 3G, RSCP, RSCQ for 4G and an impact of neighboring cellular base-stations.

In an implementation, the algorithm utilizes Eq. 3 below to measure the signal energy (1/RSRQ), as reported by the modem in dB; where, RSRP is the linear average of the power in Watts of all Resource Elements which carry cell-specific Reference Signals over the entire bandwidth.

$$\frac{1}{RSRQ} = \frac{RSSI}{RSRP \cdot \# \text{ of } RB} \qquad \text{Eq. 3}$$

The information on the number of DL RB may be calculated by the receiver

| LTE Channel Bandwidth [MHz] | Max. Number of Resource Blocks | Max. Occupied Bandwidth [MHz] |
|---|---|---|
| 1.4 | 6 | 1.08 |
| 3 | 15 | 2.7 |
| 5 | 25 | 4.5 |
| 10 | 50 | 9.0 |
| 15 | 75 | 13.5 |
| 20 | 100 | 18.0 |

$$\frac{1}{RSRQ} = \frac{\frac{\beta}{\# \text{ of } RB} \cdot \left[ \frac{\text{Serving Cell } RSRP +}{\Sigma \text{ Other Cells } RSRP} \right] + \text{Thermal Noise}}{RSRP} \qquad \text{Eq. 2}$$

Thermal Noise = $7.165 \cdot 10^{-16} \cdot NF$ $$\frac{RSSI}{\# \text{ of } RB} - \text{Thermal Noise} =$$
$$\beta [\text{Serving Cell } RSRP + \Sigma \text{ Other Cells } RSRP]$$

$$\beta = \left[ \frac{RSSI}{\# \text{ of } RB} - \text{Thermal Noise} \right] \Big/ [$$
$$\text{Serving Cell } RSRP + \Sigma \text{ Other Cells } RSRP]$$

where $$\beta \max = \frac{84}{4} = 21$$

FIG. 7 illustrates another example embodiment for calculating radio-link conditions as described herein. As shown, FIGS. 7a and 7b may be utilized to estimate uplink congestion in LTE networks based at least from information extracted from the parameters of the base station 106.

In LTE networks, there is no UL interference report. However, an approximation of number users in the network loading may be utilized by the algorithm to implement control of the one or more applications' behavior.

For example, the information that may be sent via PHICH channel to all users by the base station 106 may be utilized in the measurements of the LTE UL congestion, where the PHICH is the Physical Hybrid-ARQ Indicator Channel (PHICH) in the downlink carries Hybrid ARQ (HARQ) acknowledgements (ACK/NACK) for uplink data transfers. For example, the users or network loading is estimated by filtering the Acknowledge (Ack) and not-acknowledge (Nack) transmissions from an empty group example (i.e., none) in a sampling group. In this example, the number of active users in a single PHICH group is proportional to the cell UL loading.

In an implementation, the algorithm for the LTE networks may include calculation of the UL congestion in percentage according to histogram values correlated to maximum number of users per PHICH group. For example, to calculate the maximum number of users per PHICH group, the following are implemented. First, in network connected mode where all PHICH group is expected to contain Ack/Nack responses, the users' sequences in active PHICH group are decoded. Otherwise, in idle mode, the users' sequences in the PHICH group zero are decoded. Based on the decoded PHICH group, the number of valid users may then be calculated.

With the calculated number of valid users, these are accumulated to a valid user count histogram (i.e., not sorted by sub-frame or PHICH group). Per measuring window of window of 1~5 seconds, the histogram is normalized to percentage according to the number of samples taken in the window. Afterwards, the maximum users per PHICH group may be measured or calculated.

With continuing reference to FIG. 7, FIG. 7a illustrates a loaded group within the PHICH where the upper right portion of the figure represents the number of Nack transmissions while the lower left are the number of Ack transmissions. On the other hand, FIG. 7b illustrates presence of noise level in an empty group.

Once the conditions in the discussion above are identified, the algorithm may apply "avoiding background traffic" option in the portable device 102. For example, this is done selectively for applications 106 that are bitrate hungry, while leaving foreground traffic and low bit-rate background traffic intact. In this example, identification of prolonged state of poor RF signal is implemented when: portable device 102 is located in poor RF and is stationary; or a watchdog timer is activated to eliminate the case for de-touching from background services. This timer may be zeroed once the portable device 102 is moving, based on mobility indicators.

FIG. 8 shows an example process flowchart 800 illustrating an example method for improving power and performance in a portable device. For example, the process flowchart 800 relates to the improvement of controlling background traffic for one or more device applications. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 802, measuring a congestion amount based upon radio link conditions that include an UL or a DL transmission is performed. For example, the radio link-condition detector 210 is configured to perform an algorithm that identifies and measures different RF signal conditions and other congested radio link conditions. The radio link-condition detector 210 is a component of the portable device 102 that uses global system for mobile communications (GSM), a general packet radio services (GPRS), enhanced data rates for GSM evolution (EDGE), a 3G, or a 4G LTE, LTE-A system for data communications.

As discussed above, identification and measurements of the congestion amount may be based upon radio link conditions within the portable device 102 and/or the surrounding radio link conditions.

At block 804, comparing the measured congestion amount to a configured threshold level is performed.

At block 806, determining a level of congestion based from the measured congestion amount is performed.

At block 808, sending a notification in response to the determined level of congestion is performed. For example, the notification includes a radio link condition alert to the user of the portable device 102.

At block 810, controlling a background traffic on selected one or more applications based upon the determined level of congestion is performed. For example, based from the measured congestion amount, the algorithm may implement behavior control of the background tasks in the portable device 102.

The following examples pertain to further embodiments:

Example 1 is a method of improving power consumption and performance in a device, the method comprising: measuring a congestion amount based upon radio link condition that include an uplink (UL) or a downlink (DL) transmission; comparing the measured congestion amount to a threshold level; determining a level of congestion based on the measured congestion amount; and controlling a background traffic on selected one or more applications based on the determined level of congestion.

In example 2, the method as recited in example 1, wherein the level of congestion is based on one or more of a poor radio frequency (RF) signal level, a soft congestion level, or a hard congestion level.

In example 3, the method as recited in example 2, wherein the measurement of the congestion amount for the poor RF signal is implemented separately for the UL and the DL transmissions.

In example 4, the method as recited in example 2, wherein the measurement of the congestion amount for the soft congestion level is implemented separately for the UL and the DL transmissions.

In example 5, the method as recited in example 2, wherein the calculation of a 3G UL transmission includes a utilization of system information blocks (SIB) information of a base-station UL noise level to determine a UL load in the device.

In example 6, the method as recited in example 2, wherein the calculation of a LTE UL transmission is based PHICH channel logging and measurement.

In example 7, the method as recited in example 2, wherein the measurement of the congestion amount for the hard congestion level is implemented for both UL and the DL transmissions.

In example 8, the method as recited in example 1, wherein the measurement of the congestion amount in a 3G DL transmission includes a calculation of a base-station load based on PHY measurements, RSSI, Ec/Io, and an impact of other neighboring base-stations.

In example 9, the method as recited in example 8, wherein the measurement of the congestion amount of the 3G DL transmission further includes a utilization of system information blocks (SIB) information, which uses a common pilot channel (CPICH) power as a variable to improve calculation accuracy.

In example 10, the method as recited in example 1, wherein the measurement of the congestion amount in a LTE-4G DL transmission includes a calculation of a base-station load based on PHY measurements, RSSI, RSRP, RSRQ, an impact of other neighboring cellular base-stations, and an impact of a network data.

In example 11, the method as recited in example 10, wherein the measurement of the congestion amount of the LTE-4G DL transmission further includes a utilization of a system information blocks (SIB) information, which uses a reference symbols power and bandwidth to improve calculation accuracy.

In example 12, the method as recited in any of examples 1 to 11, wherein the measuring of the congestion amount is device agnostic and performed during data communication, wherein the data communication implements one or more of a global system for mobile communications (GSM), a general packet radio services (GPRS), enhanced data rates for GSM evolution (EDGE), a 3G, or an LTE-4G system.

In example 13, the method as recited in any of examples 1 to 11, wherein the controlling the background traffic is based upon a measured transmission power to run background tasks or applications.

Example 14 is a device comprising: one or more processors; a radio link-condition detector component coupled to the one or more processors and configured to detect and measure one or more radio link condition parameters, and utilize the one or more measured radio link condition parameters to control a background traffic on selected one or more applications.

In example 15, the device as recited in example 14, wherein the measured radio link condition parameters provides different level of congestions that include: a poor radio frequency (RF) signal level, a soft congestion level, or a hard congestion level.

In example 16, the device as recited in example 15, wherein the measurement of the radio link conditions for the poor RF signal is implemented separately for an uplink (UL) and downlink (DL) transmissions.

In example 17, the device as recited in any of examples 14 to 16, wherein the radio link-condition detector component is further configured to compare the measured radio link condition parameters to a threshold value.

In example 18, the device as recited in any of examples 14 to 16, wherein the measured radio link condition parameters include a calculated transmitting power during a poor radio frequency (RF) signal condition, wherein the controlling of the background traffic is implemented for the calculated transmitting power that is above the threshold value.

Example 19 is a method of controlling an application's behavior in a device, the method comprising: measuring a congestion amount based on radio link condition; comparing the measured congestion amount to a threshold level; and controlling a background traffic on selected one or more applications based on the comparison between the measured congestion amount and the threshold level.

In example 20, the method as recited in example 19, wherein the measurement of the congestion amount in a LTE-4G DL transmission includes a calculation of a base-station load based on PHY measurements, RSSI, RSRP, RSRQ, an impact of a neighboring cellular base-stations, and an impact of a network data.

In example 21, the method as recited in example 20, wherein the measurement of the congestion amount of the LTE-4G DL transmission further includes a utilization of a system information blocks (SIB) information, which uses a reference symbols power and bandwidth to improve calculation accuracy.

What is claimed is:

1. A method, comprising:
   measuring, via one or more processors associated with a device, one or more metrics indicative of one or more radio link conditions associated with a state of the device corresponding to (i) an uplink (UL) transmission, (ii) a downlink (DL) transmission, and (iii) the UL transmission and the DL transmission;
   identifying, via the one or more processors based upon the respectively measured one or more metrics, an existence of one or more of (i) an uplink (UL) congestion scenario, (ii) a downlink (DL) congestion scenario, and (iii) a UL and DL congestion scenario; and
   controlling, via the one or more processors, background traffic for one or more applications executed on the device based upon which of (i) the UL congestion scenario, (ii) the DL congestion scenario, and (iii) the UL and DL congestion scenario, is identified,
   wherein controlling the background traffic includes (i) when the UL congestion scenario is identified, delaying uploads of files exceeding a size threshold, (ii) when the DL congestion scenario is identified, delaying background traffic, and (iii) when the UL and DL congestion scenario is identified, avoiding an initiation of sessions during an identified barring period to save power;
   wherein at least a portion of the measurement of the one or more metrics is performed in a passive manner that is independent of connectivity of the device to a wireless network.

2. The method as recited in claim 1, wherein measuring the one or more metrics is performed during data communication including one or more of a global system for mobile communications (GSM), a general packet radio services (GPRS), enhanced data rates for GSM evolution (EDGE), a 3G, or an LTE-4G system.

3. The method as recited in claim 1, wherein the DL transmission includes a 3G DL transmission, and
   wherein the measurement of the one or more metrics in the 3G DL transmission includes a calculation of a base-station load based on physical (PHY) measurements, received signal strength indicator (RSSI), a 3G signal energy per chip (Ec/Io), and an impact of other neighboring base-stations.

4. The method as recited in claim 3, wherein the measurement of the one or more metrics in the 3G DL transmission further includes a utilization of system information blocks (SIB) information including a common pilot channel (CPICH) power.

5. The method as recited in claim 1, wherein the DL transmission includes a LTE DL transmission, and
   wherein the measurement of the one or more metrics in the LTE-4G DL transmission includes a calculation of a base-station load based on physical (PHY) measurements, received signal strength indicator (RSSI), a linear average of power (RSRP), a 4G signal energy per chip (1/RSRQ), an impact of other neighboring cellular base-stations, and an impact of a network data.

6. The method as recited in claim 5, wherein the measurement of the one or more metrics of the LTE DL transmission further includes a utilization of a system information blocks (SIB) information including reference symbols power and bandwidth.

7. The method as recited in claim 1, wherein the UL transmission includes a 3G UL transmission, and
   wherein the measurement of the one or more metrics in the 3G UL transmission includes a utilization of system information blocks (SIB) information of a base-station UL noise level to determine a UL load in the device.

8. The method as recited in claim 1, wherein the UL transmission includes a LTE UL transmission, and
   wherein the measurement of the one or more metrics in the LTE UL transmission is based on Physical Hybrid-ARQ Indicator Channel (PHICH) logging and measurement.

9. The method of claim 1, wherein:
   the congestion scenario identified for the UL transmission is a UL soft inaccessibility scenario,
   the congestion scenario identified for the DL transmission is a DL soft inaccessibility scenario, and
   the congestion scenario identified for the UL transmission and the DL transmission is a hard inaccessibility scenario.

10. The method of claim 9, wherein:
    the act of controlling the background traffic in accordance with the identified DL soft inaccessibility scenario includes delaying predetermined types of background traffic from being downloaded, the act of controlling the background traffic in accordance with the identified UL soft inaccessibility scenario and the identified hard inaccessibility scenario includes prioritizing circuit service applications over packet service applications.

11. The method of claim 1, wherein the measured metrics indicative of the UL and DL congestion scenario include one or more of physical Random Access Channel (pRACH) process failure, access class barring, or radio resource management (RRM) failure.

12. The method of claim 1, wherein the measuring is performed separately for (i) the UL transmission and (ii) the DL transmission, and as a single measurement for (iii) the UL transmission and the DL transmission.

13. The method of claim 1, wherein the measured metrics indicative of the UL and DL congestion scenario impact the device via a lack of network access or repeated failures to connect to the network.

14. The method of claim 1, wherein controlling the background traffic further includes (i) when the UL congestion scenario is identified, performing one or more of reducing resolution of multimedia content, limiting messages to include only text content, prioritizing circuit service applications over packet service applications, reducing the frequency of keep-alive messages transmissions, and blocking the execution of voice over internet protocol (VOIP) applications, (ii) when the DL congestion scenario is identified, blocking the execution of voice over internet protocol (VOIP) applications, and (iii) when the UL and DL congestion scenario is identified, performing one or more of prioritizing circuit service applications over packet service applications, stopping keep-alive message transmissions, and performing traffic shaping.

15. A device, comprising:
a radio link-condition detector component coupled to the one or more processors, the radio link-condition detector component being configured to measure one or more radio link condition parameters associated with a state of the device corresponding to (i) an uplink (UL) transmission, (ii) a downlink (DL) transmission, and (iii) the UL transmission and the DL transmission; and
one or more processors configured to utilize the one or more measured radio link condition parameters to identify an existence of one or more of (i) an uplink (UL) congestion scenario (ii) a downlink (DL) congestion scenario, and (iii) a UL and DL congestion scenario based upon the measured radio link condition parameters, and to control background traffic for one or more applications based upon which of (i) the UL congestion scenario, (ii) the DL congestion scenario, and (iii) the UL and DL congestion scenario is identified,
wherein the one or more processors are configured to control the background traffic by (i) when the UL congestion scenario is identified, delaying uploads of files exceeding a size threshold, (ii) when the DL congestion scenario is identified, delaying background traffic, and (iii) when the UL and DL congestion scenario is identified, avoiding an initiation of sessions during an identified barring period to save power, and
wherein at least a portion of the measurement of the one or more measured radio link condition parameters is performed in a passive manner that is independent of connectivity of the device to a wireless network.

16. The device as recited in claim 15, wherein the measured radio link condition parameters include the detection of a poor RF signal condition when a calculated transmitting power associated with the device is above a threshold value, and
wherein the controlling of the background traffic is further implemented when the poor RF signal condition is detected.

17. A device, comprising:
a storage device configured to store one or more executable applications; and
one or more processors coupled to the storage device, the one or more processors being configured to:
measure one or more metrics indicative of one or more radio link conditions associated with a state of the device corresponding to (i) an uplink (UL) transmission, (ii) a downlink (DL) transmission, and (iii) the UL transmission and the DL transmission;
identify an existence of one or more of (i) an uplink (UL) congestion scenario (ii) a downlink (DL) congestion scenario, and (iii) a UL and DL congestion scenario based upon the measured one or more metrics; and
control background traffic for the one or more executable applications based upon which of (i) the UL congestion scenario, (ii) the DL congestion scenario, and (iii) the UL and DL congestion scenario is identified, the control of the background traffic including (i) when the UL congestion scenario is identified, delaying uploads of files exceeding a size threshold, (ii) when the DL congestion scenario is identified, delaying background traffic, and (iii) when the UL and DL congestion scenario is identified, avoiding an initiation of sessions during an identified barring period to save power, and
wherein at least a portion of the measurement of the one or more metrics is performed in a passive manner that is independent of connectivity of the device to a wireless network.

18. The device as recited in claim 17, wherein the one or more processors are further configured to measure the one or more metrics during data communication that includes one or more of a global system for mobile communications (GSM), a general packet radio services (GPRS), enhanced data rates for GSM evolution (EDGE), a 3G, or an LTE-4G system.

19. The device as recited in claim 17, wherein the DL transmission includes a 3G DL transmission, and
wherein the one or more processors are further configured to measure the one or more metrics during the 3G DL transmission, and to calculate a base-station load based on physical (PHY) measurements, received signal strength indicator (RSSI), a 3G signal energy per chip (Ec/Io), and an impact of other neighboring base-stations.

20. The device as recited in claim 19, wherein the one or more processors are further configured to measure the one or more metrics during the 3G DL transmission utilizing system information blocks (SIB) information including a common pilot channel (CPICH) power.

21. The device as recited in claim 17, wherein the DL transmission includes a LTE-4G DL transmission, and
wherein the one or more processors are further configured to measure one or more metrics during the LTE DL transmission by calculating a base-station load based on physical (PHY) measurements, received signal strength indicator (RSSI), a linear average of power (RSRP), a 4G signal energy per chip (I/RSRQ), an impact of other neighboring cellular base-stations, and an impact of a network data.

22. The device as recited in claim 21, wherein the one or more processors are further configured to measure an amount of traffic congestion of the LTE DL transmission utilizing system information blocks (SIB) information including reference symbols power and bandwidth.

23. The device as recited in claim 17, wherein the UL transmission includes a 3G UL transmission, and
   wherein the measurement of the one or more metrics during the 3G UL transmission includes a utilization of system information blocks (SIB) information of a base-station UL noise level to determine a UL load in the device.

24. The device as recited in claim 17, wherein the UL transmission includes a LTE UL transmission, and
   wherein the one or more processors are further configured to measure the one or more metrics during the LTE UL transmission based on Physical Hybrid-ARQ Indicator Channel (PHICH) logging and measurement.

* * * * *